(12) United States Patent
Takeuchi et al.

(10) Patent No.: US 8,158,239 B2
(45) Date of Patent: Apr. 17, 2012

(54) IDENTIFICATION MEDIUM

(75) Inventors: Itsuo Takeuchi, Yokohama (JP);
Hidekazu Hoshino, Yokohama (JP);
Shinya Nasubida, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 894 days.

(21) Appl. No.: 12/087,046

(22) PCT Filed: Dec. 19, 2006

(86) PCT No.: PCT/JP2006/325278
§ 371 (c)(1),
(2), (4) Date: Jun. 25, 2008

(87) PCT Pub. No.: WO2007/074681
PCT Pub. Date: Jul. 5, 2007

(65) Prior Publication Data
US 2009/0162625 A1    Jun. 25, 2009

(30) Foreign Application Priority Data
Dec. 28, 2005   (JP) .................................. 2005-379623

(51) Int. Cl.
*B41M 5/00* (2006.01)
*B42D 15/00* (2006.01)
(52) U.S. Cl. ...................... 428/195.1; 428/206; 428/207; 428/320.2; 428/321.1; 428/321.5; 428/692.1; 428/900; 428/916; 283/82; 283/85; 283/86; 283/94

(58) Field of Classification Search ............... 428/195.1, 428/199, 206, 207, 320.2, 321.1, 321.5, 692.1, 428/900, 916; 283/82, 85, 86, 94
See application file for complete search history.

(56) References Cited

U.S. PATENT DOCUMENTS

| | | | |
|---|---|---|---|
| 7,391,546 B2 * | 6/2008 | Hoshino et al. ................ | 359/2 |
| 2002/0018044 A1 | 2/2002 | Yasuda | |
| 2002/0051264 A1 * | 5/2002 | Shiozawa et al. ............... | 359/2 |
| 2002/0196217 A1 * | 12/2002 | Kanno ............................. | 345/86 |
| 2003/0170457 A1 | 9/2003 | Iwasaki et al. | |
| 2007/0037290 A1 * | 2/2007 | Hoshino et al. ............... | 436/170 |

FOREIGN PATENT DOCUMENTS

| | | |
|---|---|---|
| CN | 1428254 A | 7/2003 |
| EP | 0 435 029 A2 | 7/1991 |
| JP | A-63-51193 | 3/1988 |
| JP | A-4-144796 | 5/1992 |
| JP | 06313880 A * | 11/1994 |
| JP | A-7-13206 | 1/1995 |
| JP | A-2001-96998 | 4/2001 |
| WO | WO 2004102234 A1 * | 11/2004 |
| WO | WO 2005040871 A1 * | 5/2005 |

OTHER PUBLICATIONS

Dec. 7, 2011 Office Action in Chinese Patent Application No. 200680048877.1 (with English translation).

* cited by examiner

*Primary Examiner* — Gerard Higgins
(74) *Attorney, Agent, or Firm* — Oliff & Berridge, PLC

(57) ABSTRACT

An identification medium provided with a laminated structure comprises laminated layers of a magnetically controllable layer, in which magnetic microcapsules are dispersed, and a color shifting layer.

2 Claims, 6 Drawing Sheets

IDENTIFICATION MEDIUM

TECHNICAL FIELD

The present invention relates to a technique for determining whether or not articles are authentic by using visual effects. In particular, the present invention relates to a technique using specific views obtained by viewing angles and specific polarization filters, and optical characteristics vary depending on the presence of a magnetic field, in combination therewith.

BACKGROUND ART

Counterfeits of articles (for example, merchandise and garments), which are produced by copying the appearances of authentic articles, are being sold, and this cause problems. Under these circumstances, in order to ensure performance, reliability, and security of articles, and to maintain the value of the brands of articles, techniques for verifying authenticity of articles are required. As a technique for verifying the authenticity of the articles, a method of printing on articles with a special ink, and a method of affixing a chip having special optical reflection characteristics on articles, are known.

In the method using the special ink printed on an article, for example, a predetermined character or a figure is printed on an article by using an ink that fluoresces under ultraviolet light. When ultraviolet light is emitted on the article, the character or the figure becomes visible on the article, so that the authenticity of the article can be determined. For example, an ink having particles of a magnetic material or magnetized particles mixed therewith may be applied on an article, and the authenticity of the article can be verified by using magnetic sensors.

In a method using a chip having special optical reflection characteristics, a chip using optical characteristics of a cholesteric liquid crystal or a hologram formed thereon may be used. For example, this technique is disclosed in Japanese Unexamined Patent Applications Publication Nos. 63-51193 and 4-144796.

However, it is relatively easy to obtain inks similar to various special inks, and anticounterfeiting effects cannot be effectively obtained. Visual holograms, which are sophisticated counterfeits, are on the market, and the authenticity thereof is not easily determined by observation. Therefore, determination of the authenticity by only using a hologram is difficult. In view of the increasing sophistication of counterfeiting techniques, an identification medium using cholesteric liquid crystal, which cannot be easily counterfeited and which will provide a good discriminating ability, is required.

DISCLOSURE OF THE INVENTION

An object of the present invention is to provide a technique in which anticounterfeiting effects are better than those of discrimination techniques using the above conventional techniques, and the technique enables articles to be distinguished easily and reliably.

The present invention provides an identification medium provided with a laminated structure comprising laminated layers of a magnetically controllable layer, in which magnetic microcapsules are dispersed, and a color shifting layer. According to the present invention, the color shifting layer exhibits color shifting, and effects of the color shifting are combined with optical effects of the magnetically controllable layer. Therefore, an identification medium that is complicated and has better anticounterfeiting effects can be obtained. That is, in the present invention, an optical function of the magnetically controllable layer, in which optical characteristics are controlled by a magnetic field, is reflected in the optical characteristics of the color shifting layer, and an optical discriminating function is thereby obtained.

A magnetically controllable sheet, in which magnetic microcapsules are dispersed, is a layer having an optical function, and the layer may transmit, reflect, or absorb visible light according to the presence of a magnetic field or removal of the magnetic field. The microcapsule contains magnetic particles and a dispersing liquid. The microcapsules are enclosed between a pair of light transparent base materials so as to form a layer, and the magnetically controllable layer in which magnetic microcapsules are dispersed is thereby formed. The magnetically controllable layer may have a structure in which magnetic microcapsules are dispersed in a light transparent binder and are formed into a layer. There are following four types of magnetically controllable layers according to the kind of magnetic microcapsule.

FIRST EXAMPLE

Scale-like magnetic particles and a dispersing liquid are contained in microcapsules. In this case, light may be reflected (or blocked) or be transmitted according to the direction of the applied magnetic field. That is, when a magnetic field is applied parallel to the magnetically controllable layer, primary surfaces of the scale-like magnetic particles are parallel to the layer, and the primary surfaces are thereby oriented parallel to the layer. Therefore, the magnetically controllable layer reflects (or absorbs) incident light at the primary surfaces and appears to be a predetermined color. On the other hand, when a magnetic field is applied perpendicular to the magnetically controllable layer, the primary surfaces of the scale-like magnetic particles are oriented perpendicular to the layer. Therefore, spaces for transmitting light are increased, whereby the magnetically controllable layer transmits some amount of incident light and appears to be transparent (or semitransparent).

SECOND EXAMPLE

Spherical black magnetic particles and powders of pigments are contained in microcapsules. In this case, when a magnet is brought close to a first side (surface) of the magnetically controllable layer, the black magnetic particles are attracted to the first side, and the magnetically controllable layer thereby appears to be black. That is, the magnetically controllable layer will function as a light absorption layer. On the other hand, when a magnet is brought close to a second side (back surface), the black magnetic particles are attracted to the second side, and the powders of pigments remain at the first side (surface). Therefore, the first side appears to be the color of the pigments. That is, the magnetically controllable layer, in which magnetic microcapsules are dispersed, can be used as a light absorption layer or a light reflection layer according to the way in which the magnetic field is applied. It should be noted that the color of the pigments can be freely selected.

THIRD EXAMPLE

In microcapsules containing black spherical magnetic particles and powders of pigments, a dispersing liquid is set to have a low viscosity so that the magnetic particles are precipitated by the effect of gravity when no magnetic field is applied. In this case, when a magnet is brought close to the side of the surface of the magnetically controllable layer, the magnetic particles are attracted thereto, and the magnetically controllable layer appears to be black. On the other hand, when the magnet is taken away from the surface, the magnetic particles fall in the dispersing liquid, and the powders of the pigments remain at the side of the surface. Therefore, the color of the surface of the magnetically controllable layer changes to the color of the pigments. In this case, the viscosity of the dispersing liquid may be adjusted so as to obtain an optical function, in which the black color is exhibited for a while and gradually fades after the magnet is removed.

FOURTH EMBODIMENT

As black magnetic particles to be contained in microcapsules, magnetic particles formed by mixing two kinds of particles having different sizes or materials are used. In this case, when a magnetic field is applied perpendicular to the magnetically controllable layer, the magnetic particles are attracted to the surface, and the surface of the magnetically controllable layer thereby appears to be black. On the other hand, when a magnetic field is applied parallel to the magnetically controllable layer, the magnetic particles are dispersed, and the density of the powders of the pigments in the vicinity of the surface is thereby relatively increased. Therefore, the magnetically controllable layer appears to be the color of the pigments.

In the above examples, the magnetic particles are selected to be black so as to provide a function for absorbing light, and the magnetic particles may not be black as long as the function of absorbing light can be obtained. For example, the magnetic particles may have a dark blue color or a dark green color.

In the present invention, the color shifting layer preferably comprises a cholesteric liquid crystal layer or a multilayer film in which plural light transparent films having different refractive indexes are laminated. Specifically, in a case of using the cholesteric liquid crystal layer, not only a color shifting, but also an optical characteristic, can be utilized. According to the optical characteristic, circularly polarized light having a predetermined wavelength and having a predetermined rotation direction is selectively reflected. Therefore, a discriminating function that exhibits various complicated appearances can be obtained.

The cholesteric liquid crystal layer is a liquid crystal layer having characteristics in which circularly polarized light having a predetermined wavelength and having a right-handed rotation direction or a left-handed rotation direction is selectively reflected when natural light enters thereinto. FIG. 7 is a schematic view showing a structure of a cholesteric liquid crystal layer, and FIG. 8 is a schematic view showing optical characteristics of a cholesteric liquid crystal layer. FIG. 8 shows a condition in which a right-handed circularly polarized light having a predetermined wavelength is reflected, and a left-handed circularly polarized light, a linearly polarized light, and right-handed circularly polarized light having other wavelengths are transmitted through a cholesteric crystal layer 801 when natural light enters into the layer.

The cholesteric liquid crystal layer has a laminated structure. In one layer, long axes of liquid crystal molecules have the same orientation and are parallel to the plane thereof in the layer. The directions of the orientation differ with respect to the adjacent layer in the direction of the layer thickness, and the layers are stacked with the orientations rotated in a three-dimensional spiral structure overall. In this structure, in a direction perpendicular to the layer, pitch P is the distance necessary for the molecular long axis to be rotated through 360° and return to the initial state, and an average refraction index of the respective layers is index n. In this case, the cholesteric liquid crystal layer selectively reflects circularly polarized light having a center wavelength $\lambda s$ and a predetermined rotation direction satisfying the equation $\lambda s = n \times P$. That is, when white light, which has uniformly polarized components, enters into the cholesteric liquid crystal layer, a right-handed or left-handed circularly polarized light having a predetermined center wavelength is selectively reflected. In this case, circularly polarized light having the same rotation direction as the reflected circularly polarized light (but not having the wavelength $\lambda s$), circularly polarized light having a reverse rotation direction to the reflected circularly polarized light, and linearly polarized light are transmitted through the cholesteric liquid crystal layer.

The rotation direction (circling direction) of the reflected circularly polarized light is determined by selecting a spiral direction of the cholesteric liquid crystal layer. That is, when the molecular long axes are viewed from the incident direction of the light, by selecting either the spiral direction in which the molecular long axis of each layer orientation is clockwise or is counterclockwise, the rotation direction (circling direction) of the reflected circularly polarized light is determined.

The cholesteric liquid crystal layer exhibits an optical characteristic called "color shifting" in which color varies with viewing angle. This is because the pitch P apparently decreases when the viewing angle increases, and the center wavelength $\lambda s$ shifts toward a shorter wavelength. For example, when a cholesteric liquid crystal is observed from a vertical direction, the reflected color thereof is red, and it is observed to shift from red to orange, to yellow, to green, to blue in turn as the viewing angle increases. It should be noted that the viewing angle is defined as the angle formed by a visual line and a vertical line against the surface of the identification medium.

As in the case of the cholesteric liquid crystal layer, a multilayer film formed by laminating plural light transparent films having different refractive indexes exhibits color shifting. FIG. 9 is a schematic view for describing a function for generation of color shifting. FIG. 9 schematically shows a multilayer film 903 having a cross sectional structure in which plurality of two kinds of light transparent films 901 and 902 having different refractive indexes are alternately laminated. When light obliquely enters into the multilayer film 903, the light is reflected at each interface of the multilayer structure. These reflections occur due to the difference of the refractive indexes of the transparent films adjacent to each other. In each of the interfaces, the incident light is partially reflected, and most of the incident light is transmitted therethrough. That is, the incident light entering the interfaces of the laminated films is partially reflected at each interface. The incident light is generally reflected in the same directions at each interface, and interference is thereby generated depending on optical path differences.

When the incident light enters the films from a direction approximately parallel to the surface, the optical path difference is small, and the light waves having shorter wavelengths interfere and reinforce each other. According to this function, when the viewing angle is increased, the reflected light waves having shorter wavelengths interfere and reinforce each other. As a result, when the multilayer film 903 is viewed under white light, the multilayer film 903 appears to be a predetermined color at a viewing angle of 0° and gradually changes color to a bluish state as the viewing angle is increased. Such a phenomenon, that is, color shifting can be observed.

This multilayer film may be formed by laminating three or more kinds of thin films having different refractive indexes. There may be various methods for laminating films, and any of the methods may be used as long as thin films are laminated so that the adjacent thin films have different refractive indexes.

In the present invention, a structure is preferably formed by laminating a color shifting layer and a magnetically controllable layer in turn from an observation side. In addition, the magnetically controllable layer preferably has a structure in which one of the function of a light absorption layer and the function of a light reflection layer can be selected by applying a magnetic field. In this case, as viewed from the observation side, the back side of the color shifting layer can be magnetically changed into a light absorption layer or a light reflection layer. Accordingly, the optical function of the color shifting layer can be more complicated.

In the present invention, a structure is preferably formed by laminating a magnetically controllable layer and a color shifting layer in turn from an observation side. In addition, the magnetically controllable layer preferably has a structure in which one of the function of a light cut-off layer and the function of a light transmission layer can be selected by applying a magnetic field. In this case, the magnetically controllable layer may function as a light shutter that can be controlled by a magnetic field.

In the present invention, the color shifting layer is preferably formed with a hologram. In this case, characters and designs that are made as a hologram can be used for identification.

In the present invention, a magnetic layer for applying a magnetic field to the magnetically controllable layer is preferably provided to the laminated structure. In this case, whereas a magnetic field is not applied from the outside, a magnetic field is continuously applied to the magnetically controllable layer, and the optical function of the magnetically controllable layer, which may occur by applying a magnetic field, can thereby be obtained. By applying a magnetic field, which is stronger than that generated by the magnetic layer, from the outside, the optical function of the magnetically controllable layer can be controlled. As a method for forming a magnetic field, a method in which a laminated structure including a magnetic material is subjected to a strong magnetic field so as to magnetize it may be mentioned.

According to the present invention, an identification medium having a simple structure can be obtained, and the identification medium will provide a good discriminating ability and cannot be easily counterfeited.

Figure 1:
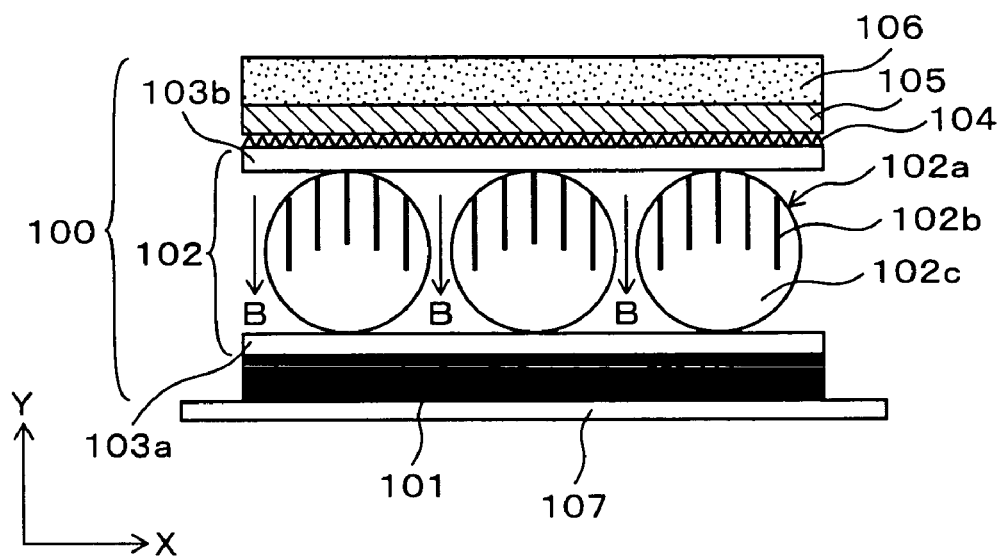
FIG. 1 is a schematic view showing a cross sectional structure of an identification medium using the invention.

EXPLANATION OF REFERENCE NUMERALS 100 denotes an identification medium, 101 denotes a light absorption layer and concurrently adhesive layer, 102 denotes a magnetically controllable sheet, 102a denotes magnetic microcapsules, 102b denotes flake-like magnetic particles, 102c denotes a dispersing liquid, 102d denotes a magnetic microcapsule, 102e denotes flake-like magnetic particles, 103a denotes a light transparent resin film, 103b denotes a light transparent resin film, 104 denotes an embossed pattern, 105 denotes a cholesteric liquid crystal layer, 106 denotes a light transparent resin film, 107 denotes a separator, 200 denotes a magnetic pen, 201 denotes a magnet, and 202 denotes a spacer.

BEST MODE FOR CARRYING OUT THE INVENTION

1. First Embodiment

Structure

FIG. 1 is a cross sectional drawing schematically showing an outline of an identification medium of the first embodiment. FIG. 1 shows an identification medium 100 comprising a magnetically controllable sheet 102, in which magnetic microcapsules 102a are dispersed and maintained, on a light absorption layer and concurrently adhesive layer 101. Moreover, the identification medium 100 comprises a cholesteric liquid crystal layer 105 on the magnetically controllable sheet 102. The light absorption layer and concurrently adhesive layer 101 is a layer that is made of an adhesive material with a black pigment (or a black dye) added thereto, and it is used for affixing the identification medium 100 on an article to be identified. The light absorption layer and concurrently adhesive layer 101 absorbs light that is transmitted through the cholesteric liquid crystal layer 105 and is attached with a separator 107. In order to affix the identification medium 101 on an article, the separator 107 is peeled off so as to expose the light absorption layer and concurrently adhesive layer 101, and the exposed surface is brought into contact with the article.

In the magnetically controllable sheet 102 in which magnetic microcapsules 102a are dispersed and maintained, the magnetic microcapsules 102a are maintained between a pair of light transparent resin films 103a and 103b. The magnetic microcapsules 102a have a structure in which flake-like magnetic particles 102b are dispersed in a dispersing liquid 102c. The flake-like magnetic particles 102b have magnetic properties that are polarized in the flat direction thereof, and the primary surfaces (flat surfaces) are whitish.

As the dispersing liquid 102c, for example, liquid paraffin may be preferably used, and the compositions thereof are not limited as long as the flake-like magnetic particles 102b are securely dispersed and maintained in the magnetic microcapsules 102a. The magnetic microcapsules 102a may contain a dispersing agent for preventing clumping of the flake-like magnetic particles 102b. The magnetic microcapsules 102a may be made of a gelatin.

In order to reliably disperse the magnetic microcapsules 102a, a binder may be used. The compositions of the binder are not limited as long as the microcapsules 102a made of a gelatin are reliably dispersed and bonded, and as long as the binder has a good adhesive property with respect to a substrate and is transparent. For example, polyvinyl alcohol is preferably used as a binder.

The layer including the magnetic microcapsules 102a requires a thickness that is greater than the mean diameter of the magnetic microcapsules 102a. The specific thickness may be appropriately selected so that the layer exhibits an image at a high contrast. In the figure, the magnetic microcapsules 102a form a line in a thickness direction of the layer, but the magnetic microcapsules 102a preferably form plural lines or are piled up in a thickness direction of the layer so as to obtain an image with a high contrast. In general, the layer including the magnetic microcapsules 102a preferably has a thickness (a distance between the pair of the light transparent resin films 103a and 103b) of approximately 20 to 200 μm.

In the flake-like magnetic particles 102b, the material, the oblateness, and the dimensions are selected so as to yield functions that will be described hereinafter. For example, flat particles such those of as Fe, Ni, alloys of Fe and Ni, alloys of Fe, Ni, and Cr, alloys of Al and Co, alloys of Fe, Al, and Si, and alloys of Sm and Co are preferable. The mean diameter of primary surfaces of the flake-like magnetic particles 102b is preferably not less than 1 μm. When the mean diameter is very small with respect to the wavelength of visible light, the reflectance is decreased, and change of the reflectance due to the change in the orientation is thereby small. As a result, information will be exhibited at low contrast. The specific value of the mean diameter of the primary surfaces depends on the diameters of the magnetic microcapsules 102a and the number of the magnetic particles included therein. The mean diameter is appropriately selected within a range in which the orientation of the magnetic particles can be changed in the magnetic microcapsules 102a, and in general, the mean diameter is preferably set to be 5 to 15 μm.

FIG. 1 shows a condition in which the magnetic particles 102b are oriented in the Y direction by applying a magnetic field in the Y direction (perpendicular magnetic field). In this example, the viscosity of the dispersing liquid 102c is adjusted so that the orientation conditions of the magnetic particles 102b are maintained even when the magnetic field is removed.

The cholesteric liquid crystal layer 105 is formed on the back surface of the light transparent resin film 106 and is formed with an embossed pattern 104 for forming a hologram on the magnetically controllable sheet 102. In this example, the cholesteric liquid crystal layer 105 is set to selectively reflect red right-handed circularly polarized light. The identification medium 100 is observed from the light transparent resin film 106. The embossed pattern 104 may be formed on the cholesteric liquid crystal layer 105 at the side of the resin film 106.

In this embodiment, the magnetically controllable sheet functions as a light cut-off layer or a light transmission layer, and one of the functions thereof is appropriately selected by the application condition of a magnetic field. The selected function and the optical function of the cholesteric liquid crystal layer 105 are combined, and identification is performed.

Production Method

First, as light transparent resin films 103a and 103b, TAC (tri-acetyl cellulose) films are prepared. The light transparent resin films 103a and 103b are disposed so as to face each other at a predetermined distance, and microcapsules 102a are filled therebetween. The microcapsules 102c contain a dispersing liquid 102c in which flake-like magnetic particles 102b are dispersed. Thus, a magnetically controllable sheet 102 in which the magnetic microcapsules 102a are dispersed between the light transparent resin films 103a and 103b is obtained. Then, a light absorption layer and concurrently adhesive layer 101 with black pigments added is formed on an exposed surface of the light transparent resin film 103a, and a separator 107 is attached thereon. In this case, an application material, in which magnetic microcapsules 102a and a binder are mixed, may be applied to the light transparent resin film 103a and be dried. Then, the light transparent resin film 103b may be laminated on the application material, so as to obtain a magnetically controllable sheet 102. Alternatively, an application material, in which magnetic microcapsules 102a and a binder are mixed, may be applied to an exposed surface of the cholesteric liquid crystal layer 105 and be dried, so as to form a magnetically controllable sheet. In this case, the light transparent resin films 103a and 103b are not required.

A low-molecular-weight cholesteric liquid crystal is dissolved in a polymerizable monomer, and temperature conditions are controlled, so that cholesteric liquid crystals grow. After that, the low-molecular weight liquid crystals are cross-linked by light reactions or thermal reactions, so as to fix the molecular orientation thereof and to polymerize. As a result, a raw liquid of cholesteric liquid crystal is obtained. The raw liquid is applied at a predetermined thickness to one side of a light transparent resin film 106 (TAC (tri-acetyl cellulose) film) that is a substrate, whereby cholesteric orientation and molecular orientation thereof are fixed.

In the embodiment, the direction of torsion of the liquid crystal molecules and the pitch P are adjusted so that right-handed circularly polarized light is selectively reflected, and that the liquid crystal appears to be red when the viewing angle is 0°. Then, the cholesteric liquid crystal layer 105 is embossed during heating so as to form an embossed pattern 104. This embossed pattern 104 forms a hologram. As a result, a member provided with a cholesteric liquid crystal layer 105 that is formed with a hologram on the light transparent resin film 106 is obtained. This member is turned upside down, and the surface formed with the embossed pattern 104 is affixed on the light transparent resin film 103b. Thus, an identification medium 100 shown in FIG. 1 is obtained.

In order to obtain a raw liquid of the cholesteric liquid crystal, a thermotropic polymer liquid crystal of the branched-chain type or the straight-chain type may be heated to a temperature of the liquid crystal transition point thereof or higher, so that a cholesteric liquid crystal structure grows. Then, the molecular orientation thereof may be fixed by cooling to a temperature of the liquid crystal transition point or lower. Alternatively, a lyotropic polymer liquid crystal of the branched-chain type or the straight-chain type may be oriented in a cholesteric orientation in a solvent, and the molecular orientation thereof may be fixed by gradually evaporating the solvent.

As a raw material of the above materials, a branched-chain type polymer having a liquid crystal forming group in a branched-chain, such as a polyacrylate, a polymethacrylate, a polysiloxane, and a polymalonate may be mentioned. Alternatively, a straight-chain type polymer having a liquid crystal forming group in a straight chain, such as a polyester, a polyester amide, a polycarbonate, a polyamide, and a polyimide may be mentioned.

Function

In the identification medium 100 shown in FIG. 1, a magnetic pole (north pole or south pole) of a magnet is brought close to or is brought into contact with the entire exposed surface of the light transparent resin film 106. At this time, a perpendicular magnetic field (magnetic field in the Y direction) is applied to the magnetic microcapsules 102a, whereby the flake-like magnetic particles 102b are oriented along the Y direction, and the flat directions thereof are aligned as shown in FIG. 1.

In this case, when the identification medium 100 is observed from the light transparent resin film 106, red right-handed circularly polarized light that is reflected at the cholesteric liquid crystal layer 105 is visible. Right-handed circularly polarized light other than red, left-handed circularly polarized light, and linear polarized light that are transmitted through the cholesteric liquid crystal layer 105 are transmitted through the magnetically controllable sheet 102 and are absorbed by the light absorption layer and concurrently adhesive layer 101. Then, the figure of the hologram formed by the embossed pattern 104 is observed.

By tilting the identification medium 100, the figure of the hologram is observed to shift in color. When the identification medium 100 is observed through an optical filter (viewer) that selectively transmits left-handed circularly polarized light, the red right-handed circularly polarized light reflected from the identification medium 100 is cut off. As a result, the figure of the hologram formed by the embossed pattern 104 cannot be seen. When the identification medium 100 is observed through an optical filter (viewer) which selectively transmits right-handed circularly polarized light, the red figure of the hologram formed by the embossed pattern 104 can be observed.

Figure 2:
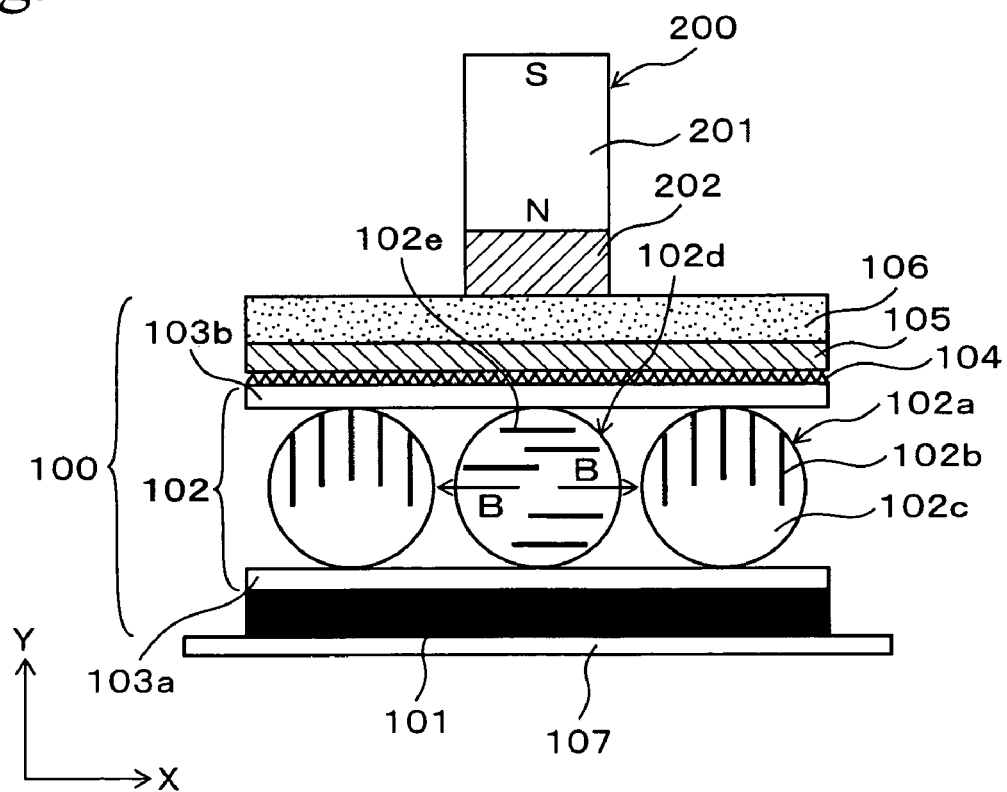
FIG. 2 is a schematic view showing a cross sectional structure of an identification medium using the invention.

Next, an optical function will be described, the optical function being exhibited when the discrimination medium 100 in the condition shown in FIG. 1 is partially subjected to a magnetic field in the horizontal direction (X direction) (parallel magnetic field). FIG. 2 is a schematic view showing a condition in which the identification medium 100a is partially subjected to a parallel magnetic field. FIG. 2 shows a condition in which a magnetic pen 200 is in contact with a part of the identification medium 100. The magnetic pen 200 has a structure in which one of the magnetic poles of the magnet 201 is mounted with a spacer 202 that is a nonmagnetic material (for example, a resin material). Because of the spacer 202, the component in the X direction of a magnetic line (that is, parallel magnetic field) generated by the magnetic pole of the magnet 201 is applied to the magnetic microcapsules 102a. By removing the spacer 202 so that the magnet 201 is in direct contact with the identification medium 100, a perpendicular magnetic field (magnetic field in the Y direction) is applied to the magnetic microcapsules 102a. A pen-shaped magnetic pen is generally used, an end thereof is mounted with a magnet having a spacer, and the other end thereof is mounted with a magnet without a spacer. Accordingly, a parallel magnetic field and a perpendicular magnetic field can be appropriately applied to a freely selected portion.

As shown in FIG. 2, when a magnetic pen 200 with a spacer is brought into contact with a portion, the magnetic microcapsule 102d under the portion is subjected to a magnetic field in the horizontal direction (X direction). Therefore, the magnetic particles 102e in the magnetic microcapsule 102d have surfaces that are oriented in the horizontal direction.

Then, the magnetic pen 200 is separated so as to directly observe the identification medium 100. Since the magnetic particles 102e under the portion that is traced with the magnetic pen 200 are horizontally oriented, white light reflected from the primary surfaces of the magnetic particles 102e can be observed at the portion. A part of the reflected light is transmitted through the cholesteric liquid crystal layer 105. Therefore, when the identification medium 100 is directly observed from the light transparent resin film 106, the white trace can be faintly observed in the red right-handed circularly polarized light reflected from the cholesteric crystal layer 105. For example, when a character is written by tracing over the light transparent resin film 106 with a magnetic pen 200, and the identification medium 100 is observed, a pale white character written with the magnetic pen can be observed over the red hologram image.

When the identification medium is observed through an optical filter which selectively transmits left-handed circularly polarized light, the right-handed circularly polarized light reflected from the cholesteric liquid crystal layer 105 is cut off. Therefore, the trace written with the magnetic pen 200 can be observed distinctly, and the trace appears to be white on a black background.

Moreover, the portion of the above white character is traced with a magnetic pen for applying a perpendicular magnetic field (spacer 202 is not disposed thereon). As a result, the condition of the magnetic particles 102e in the magnetic microcapsule 102d is changed into a condition shown by the reference numeral 102b, and the white display disappears. In this case, when the identification medium is viewed, only the hologram image is observed to appear to shift in color. When the identification medium is observed through an optical filter that selectively transmits left-handed circularly polarized light, the entire surface appears to be black.

As a means for applying a magnetic field, instead of an object such as a magnetic pen, by which a magnetic field is partially applied, an object, by which a perpendicular magnetic field or a parallel magnetic field is applied to the entire surface, may be used. Accordingly, the entire surface of the magnetically controllable sheet 102 may transmit light or reflect light (or absorb light), and the condition thereof can be appropriately selected.

According to this embodiment, an identification medium can be obtained, the identification medium having a function, in which characters and figures are displayed by applying a magnetic field, in addition to an discriminating function exhibited by the cholesteric liquid crystal. In this identification medium, characters and figures may be exhibited by writing with a magnetic pen, and these are combined with the discriminating function of the cholesteric liquid crystal. Therefore, the identification medium exhibits a specific appearance, thereby improving the anticounterfeiting effect. Specifically, since characters and figures can be displayed by applying a magnetic field and be freely selected when identification is performed, an article in which a figure is preselected is easily identified as a counterfeit.

The function of the color shifting of the cholesteric liquid crystal layer 105 is affected by the condition of the magnetically controllable sheet 102, and this affects the identifying function. For example, when the entire surface of the magnetically controllable sheet 102 reflects light due to the application of a parallel magnetic field, the color shifting of the cholesteric liquid crystal layer 105 is affected by the light reflected from the magnetically controllable sheet 102. In this case, by applying a perpendicular magnetic field to the magnetically controllable sheet 102, the above effect is cancelled, and the appearance obtained by the color shifting is thereby changed. For example, when the primary surfaces of the flake-like magnetic particles 102b are set to exhibit green, green light reflected from the magnetically controllable sheet 102 is observed according to the direction of the applied magnetic field. The green reflected light affects the manner of the color shifting that occurred due to the cholesteric liquid crystal layer 105, and complicated visual effects can thereby be observed. Specifically, by partially applying a magnetic field, a color change shown by the color shifting can be observed at an optional pattern of a figure.

2. Second Embodiment

In the first embodiment, the magnetically controllable sheet 102 needs not be provided over the entire surface and may be provided partially. For example, the magnetic microcapsules 102a are dispersed in an area so as to form a pattern of a character. In this case, an area other than the area in which the magnetic microcapsules 102a are dispersed is filled with a light transparent material, so that light transmitted through the area is absorbed by the light absorption layer and concurrently adhesive layer 101.

Figure 3A:
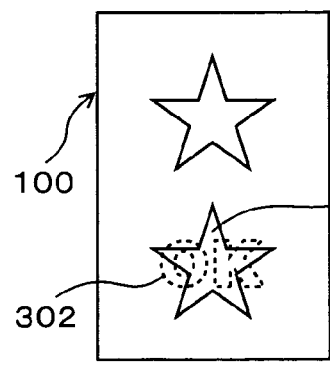
FIGS. 3A to 3C are schematic views showing appearances of an identification medium using the invention.
Figure 3B:
Figure 3C:
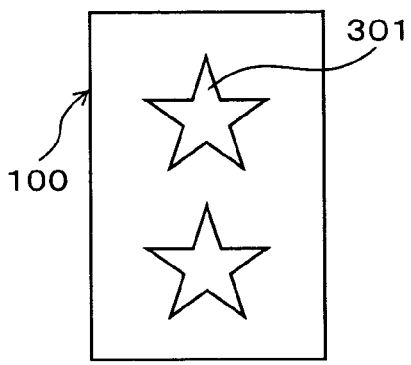

FIGS. 3A to 3C are schematic views showing appearances of a discrimination medium 100 when the magnetic microcapsules 102a are dispersed in an area so as to form a pattern of a character. In this case, an example will be described, and in the example, the magnetic microcapsules 102a are dispersed in an area so as to form a character pattern of "OK", and an embossed pattern 104 forms a star-shaped hologram figure.

First, a parallel magnetic field is applied to the entire surface of the identification medium 100 so that flake-like magnetic particles in the magnetic microcapsules forming the area of the character pattern of "OK" are oriented in the parallel direction. Then, when the identification medium 100 is viewed at a viewing angle of 0° (that is, from the perpendicular direction), red light reflected from the cholesteric liquid crystal layer is observed, and a star-shaped hologram 301 is viewed in the red background as shown in FIG. 3A. Moreover, white light reflected from the magnetically controllable sheet can also be faintly observed, and a white display 302 can be recognized as "OK" at low contrast. In this case, when the identification medium 100 is tilted, the hologram 301 exhibits color shifting whereas the display 302 does not exhibit color shifting.

Next, the identification medium 100 is observed through an optical filter that selectively transmits left-handed circularly polarized light. In this case, since light reflected from portions other than the pattern of "OK", which is formed in the magnetically controllable sheet, is red right-handed circularly polarized light reflected from the cholesteric liquid crystal layer, the reflected light is cut off by the optical filter. On the other hand, since white light reflected from the magnetically controllable sheet includes various polarization components, a part of the white reflected light is transmitted through the optical filter. Therefore, as shown in FIG. 3B, the white display of "OK" is distinctly observed on a black background.

Then, the identification medium 100 is observed through an optical filter that selectively transmits right-handed circularly polarized light. In this case, most of the white light reflected from the magnetically controllable sheet 102 is cut off by the optical filter, whereby the characters of "OK" are difficult to see, and the star-shaped hologram display 301 can be distinctly observed in a red background as shown in FIG. 3C.

Thus, by combining elements such as the presence of a magnetic field, the direction of the applied magnetic field, the usage and the type of the optical filter, and the change in the viewing angle, the authenticity of an identification medium can be determined. In a condition in which the discrimination medium is observed through the left-handed circularly polarized light-transparent filter as shown in FIG. 3B, a perpendicular magnetic field is applied to the entire surface thereof. As a result, the flake-like magnetic particles in the magnetic microcapsules forming the pattern of "OK" are perpendicularly oriented. Therefore, the light reflected from the magnetic particles is decreased, and the white display of "OK" is thereby difficult to see.

3. Third Embodiment

Figure 4A:
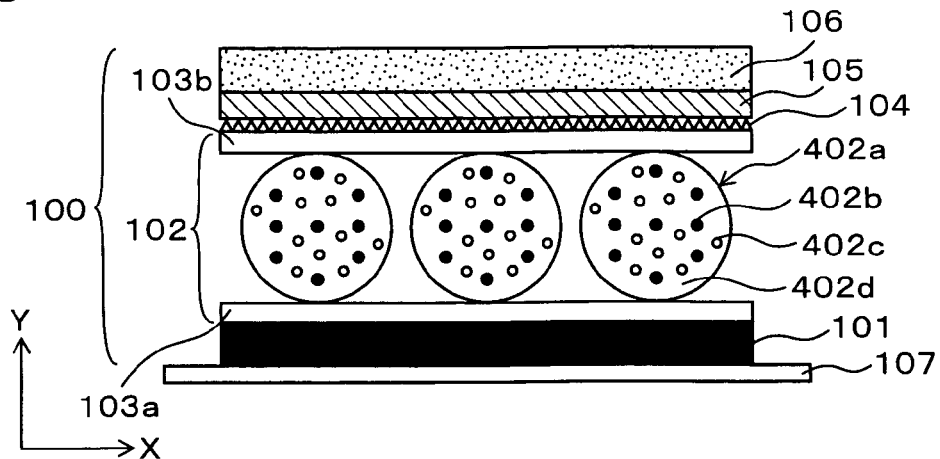
FIGS. 4A to 4C are schematic views showing cross sectional structures of an identification medium using the invention.
Figure 4B:
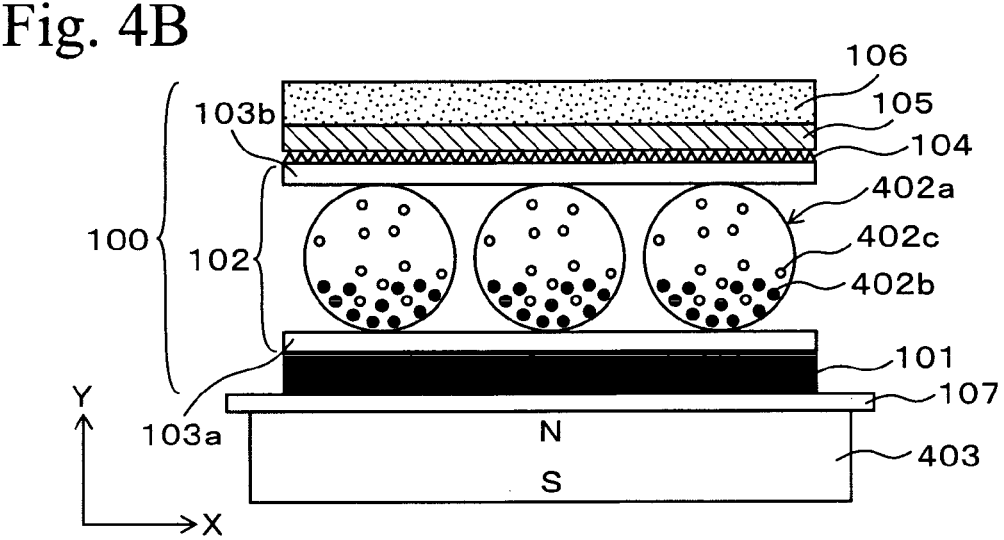
Figure 4C:
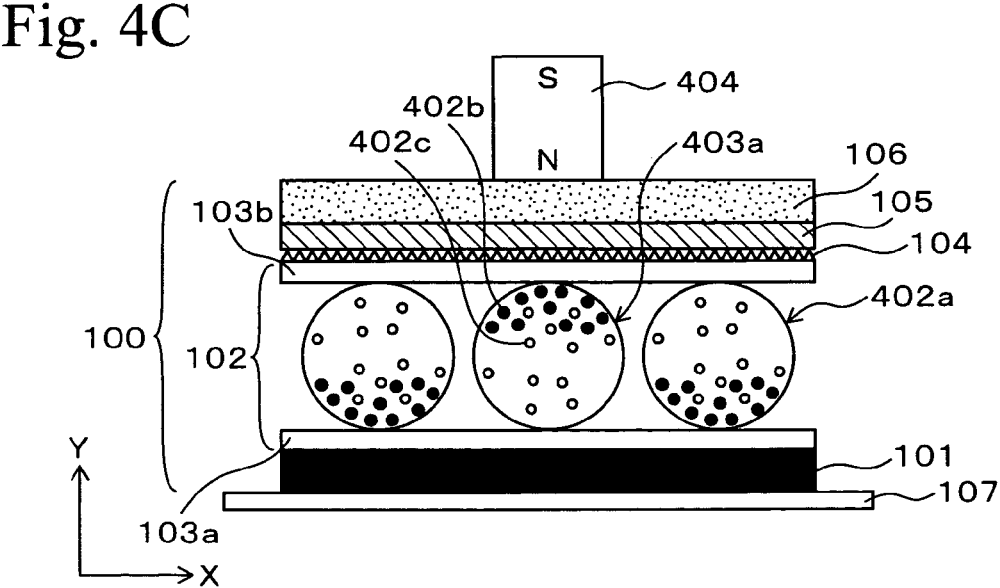

In the first embodiment, spherical black magnetic particles, powder of white pigments, and dispersing liquid are contained into the magnetic microcapsules 102a. FIGS. 4A to 4C are schematic views showing a cross sectional structure of an identification medium in the third embodiment. FIG. 4A shows a condition in which no magnetic field is applied, FIG. 4B shows a condition in which a magnetic field is applied to the entire back surface, and FIG. 4C shows a condition in which a magnetic field is partially applied from the surface side. As shown in FIG. 4A, the identification medium 100 of this embodiment comprises magnetic microcapsules 402a that are changed from the magnetic microcapsules 102a shown in FIG. 1. In this case, the portions having the same reference numerals as those in FIG. 1 have the same structures as those shown in FIG. 1.

The magnetic microcapsules 402a has a structure containing black magnetic particles 402b, nonmagnetic powder of white pigments 402c, and dispersing liquid 402d in microcapsules. When no magnetic field is applied, as shown in FIG. 4A, the black magnetic particles 402b and the powder of white pigments 402c are randomly dispersed.

When a magnetic pole of a magnet 403 is brought close to the entire back surface side (the side of the light absorption layer and concurrently adhesive layer 101), the black magnetic particles 402b are attracted to the magnet 403. As a result, the density of the black magnet particles 402b is increased at the lower side of the magnetic microcapsules 402a, and the density of the black magnet particles 402b is decreased at the upper side of the magnetic microcapsules 402a. On the other hand, since the powder of white pigments 402c are made of a magnetic material, the powders of white pigments 402c are not affected by the magnetic field of the magnet 403 and exist in the magnetic microcapsules 402a at the same condition as that shown in FIG. 4A. Therefore, the density of the white pigments 402c at the upper side of the magnetic microcapsules 402a is relatively high, whereby the reflectance of the incident light entering from the cholesteric liquid crystal layer 105 is high compared to the case of FIG. 4A. As a result, the magnetically controllable sheet 102 exhibits a function of a light reflection layer. That is, when a magnet is brought close to the identification medium as shown in FIG. 4B, the magnetically controllable sheet 102 containing the magnetic microcapsules 402a functions as a light reflection layer.

Next, an example will be described, and in this example, the magnet 403 is removed, and a magnetic pen 404 is pushed against the surface of the light transparent resin film 106, so as to partially apply a magnetic field as shown in FIG. 4C. As shown in FIG. 4C, in the magnetic microcapsules 403a under the portion against which the magnetic pen 404 is pushed, the black magnetic particles 402b are attracted by the magnetism of the magnetic pen 404 and are thereby moved upwardly. On the other hand, the nonmagnetic powder of white pigments 402c are not affected by the magnetic field. As a result, the black magnetic particles 402b are partially gathered at the upper side of the magnetic microcapsules 403a. In this portion, the absorption efficiency of the incident light entering from the cholesteric liquid crystal layer 105 is high, compared to the case of FIG. 4B. That is, when a magnet is brought close to the identification medium as shown in FIG. 4C, a part of the magnetically controllable sheet 102 functions as a light absorption layer.

For example, when the magnetically controllable sheet 102 is in a condition as shown in FIG. 4B, the identification medium is directly observed from the light transparent resin film 106. In this case, components other than red right-handed circularly polarized light are transmitted through the cholesteric liquid crystal layer 105 and are reflected at the magnetically controllable sheet 102, and a part of the components are then transmitted through the cholesteric liquid crystal layer 105. Therefore, when the identification medium 100 is observed through an optical filter that selectively transmits left-handed circularly polarized light, the light reflected from the identification medium can be observed.

Next, when the surface of the light transparent resin film 106 is traced with the magnetic pen 404, the trace functions as a light absorption layer due to the function shown in FIG. 4C. In this case, when the identification medium 100 is observed through an optical filter that selectively transmits left-handed circularly polarized light, the light reflected from the trace portion only includes right-handed circularly polarized light reflected from the cholesteric liquid crystal layer 105. Therefore, the trace appears to be black at high contrast. Then, when the optical filter that selectively transmits left-handed circularly polarized light is removed, the light reflected from the cholesteric liquid crystal layer 105 can be seen, whereby the trace formed by tracing with the magnetic pen 404 appears to be blackish at low contrast.

4. Fourth Embodiment

In this embodiment, as the magnetic microcapsules used in the second embodiment, microcapsules containing spherical black magnetic particles and powder of pigments are used. In this structure, when the entire surface of the surface side of the identification medium is traced with a magnet, an area in which the magnetic microcapsules are dispersed so as to form the characters of "OK" turns black. In this case, the portion that has turned black functions as a light absorption layer, and the portion exhibits the same appearance as an ordinary cholesteric liquid crystal. Then, when the entire back side is traced with the magnet, the portion that has turned black at the observation side of the magnetically controllable sheet turns white, and the portion thereby functions as a light reflection layer. In this case, when the identification medium is normally directly observed, the characters of "OK" emerge and appear to be white at low contrast. On the other hand, when the identification medium is observed through an optical filter that selectively transmits left-handed circularly polarized light, the characters of "OK" emerge and appear to be white at high contrast.

5. Fifth Embodiment

In this embodiment, as the magnetic microcapsules used in the first embodiment, microcapsules containing black spherical magnetic particles and powder of pigments are used. In addition, viscosity of the dispersing liquid is set to be low so that the magnetic particles are precipitated by the effect of gravity when no magnetic field is applied. In this structure, when the observing surface of the identification medium is traced with a magnetic pen, the traced portion of the surface of the magnetically controllable sheet turns black. In this case, the trace emerges and appears to be red when the identification medium is normally directly observed, and the trace emerges and appears to be black at high contrast when the identification medium is observed through an optical filter that selectively transmits left-handed circularly polarized light. Then, when the magnetic pen is removed from the identification medium, the trace formed by tracing with the magnetic pen gradually fades over time. In order to effectively exhibit the function of the magnetically controllable sheet of this embodiment, the observing surface of the identification medium should face upwardly so as to effectively use the effect of gravity.

6. Sixth Embodiment

In this embodiment, as the magnetic microcapsules used in the second embodiment, microcapsules containing black spherical magnetic particles and powder of pigments are used. In addition, viscosity of the dispersing liquid is set to be low so that the magnetic particles are precipitated by the effect of gravity when no magnetic field is applied. In this structure, when the identification medium is normally directly observed while no magnetic field is applied, the character pattern of "OK" appears to be white at low contrast. On the other hand, when the identification medium is observed through an optical filter that selectively transmits left-handed circularly polarized light, the character pattern of "OK" can be distinctly observed to be white on a black background. When the identification medium is observed from the surface immediately after a magnet is brought close thereto and is removed therefrom, the character pattern of "OK" is difficult to see. Then, the character pattern of "OK" gradually emerges and appears to be white.

7. Seventh Embodiment

In this embodiment, as the magnetic microcapsules used in the first embodiment, a mixture of two kinds of black magnetic particles having different sizes (or materials) is used and is contained in microcapsules.

Figure 5A:
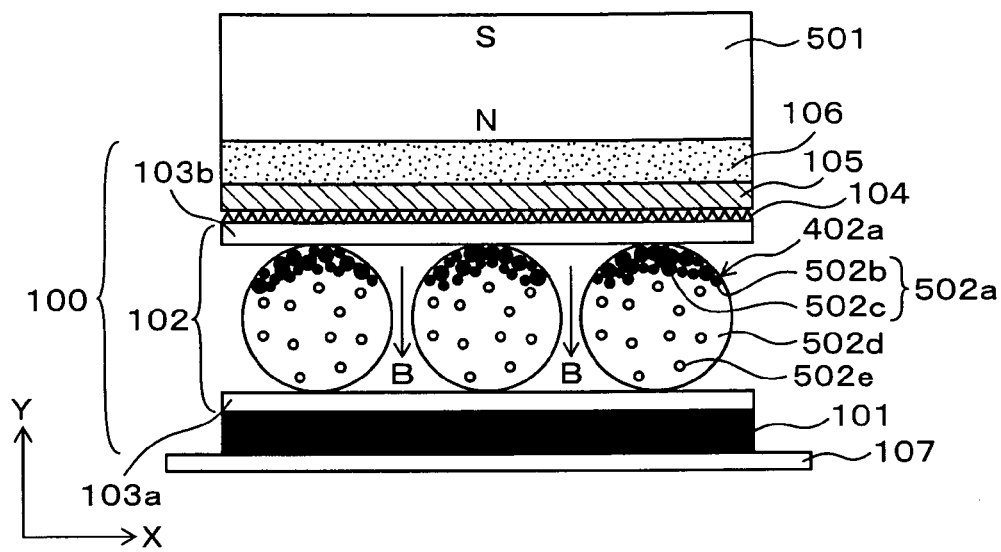
FIGS. 5A and 5B are schematic views showing cross sectional structures of an identification medium using the invention.
Figure 5B:
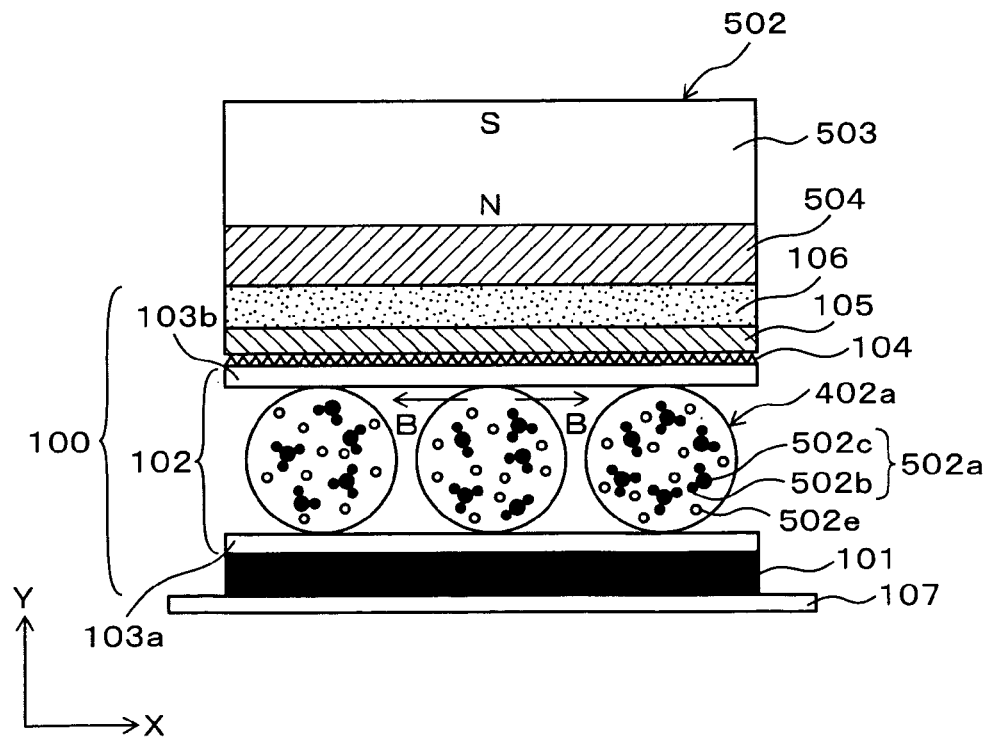

FIGS. 5A and 5B are schematic views showing a cross sectional structure of an identification medium using this embodiment. FIG. 5A shows a condition in which a perpendicular magnetic field (magnetic field in the Y direction) is applied, and FIG. 5B shows a condition in which a parallel magnetic field (magnetic field in the X direction) is applied. In this case, magnetic microcapsules 402a contain dispersing liquid 502d, two kinds of magnetic particles 502b and 502c, and nonmagnetic powder of white pigments 502e. In this example, regarding the two kinds of the magnetic particles 502b and 502c, the former is relatively small, and the latter is relatively large. The magnetic particles 502b and 502c are combined together and form complex magnetic particles 502a. In this case, as the powder of white pigments 502e, a titanium oxide may be used.

When a parallel magnetic field is applied so that the magnetic line extends in the horizontal direction (X direction), the complex magnetic particles 502a in the magnetic microcapsules 402a migrate and are dispersed by the effect of the magnetic line. As a result, alternatively, a large amount of the nonmagnetic powders made of powder of white pigments 502e are gathered to the surface side of the identification medium and appear to be white.

As shown in FIG. 5A, when one of the magnetic poles of a magnet 501 is contacted on (or brought close to) the surface of the light transparent resin film 106, which is an observing surface, the magnetically controllable sheet is applied with a perpendicular magnetic field. Therefore, the complex magnetic particles 502a are attracted by the magnetic pole of the magnet 501 and are moved. As a result, as shown in FIG. 5A, the complex magnetic particles 502a are gathered at the upper side. In this case, when the identification medium 100 is observed from the light transparent resin film 106, the magnetically controllable sheet 102 exhibits a function of a light absorption layer.

On the other hand, a magnet 502 is used, so that a magnet 503 contacts (or is brought close to) the light transparent resin film 106 via a spacer 504 made of a nonmagnetic material. In this case, a parallel magnetic field is applied to the magnetically controllable sheet 102 because of the spacer 504. The complex magnetic particles 502a are distributed so as to be dispersed in the magnetic microcapsules 402a by the parallel magnetic field. Therefore, the conditions shown in FIG. 5B are produced. The reflection of the powder of the white pigments 502e is increased, whereby the magnetic microcapsules 402a appear to be white.

In this structure, when a perpendicular magnetic field is applied from the surface side (the observing surface side) of the identification medium 100, the observing surface side of the magnetically controllable sheet 102 under the portion subjected to the perpendicular magnetic field turns black. In this case, when the identification medium is directly observed, the trace of the portion subjected to the perpendicular magnetic field can be observed at low contrast. On the other hand, when the identification medium is observed through an optical filter that selectively transmits right-handed circularly polarized light, the trace can be recognized to be red at high contrast. When a parallel magnetic field is applied to a portion from the surface side, the observing surface side of the magnetically controllable sheet under the portion turns white. By using this phenomenon, characters that are drawn by applying the perpendicular magnetic field can be erased. In this case, the function of the perpendicular magnetic field and the parallel magnetic field may be switched so as to perform identification.

8. Eighth Embodiment

In this embodiment, as the magnetic microcapsules used in the second embodiment, a mixture of two kinds of black magnetic particles having different sizes or materials is used and is contained in microcapsules. In this structure, when a perpendicular magnetic field is applied to the entire surface from the surface side of the identification medium, the observing surface side of an area of the magnetic microcapsules forming the pattern of "OK" turns black. Then, the pattern exhibits the function of the cholesteric liquid crystal layer. In this case, the entire surface of the identification medium appears to be black, and the character cannot be seen.

Next, when a parallel magnetic field is applied to the entire surface from the surface side of the identification medium, the area of the magnetic microcapsules forming the pattern of "OK" turns white. In this case, when the identification medium is directly observed, the character pattern of "OK" appears to be white at low contrast. When the identification medium is observed through an optical filter that selectively transmits right-handed circularly polarized light, the character pattern is barely visible. When the identification medium is observed through an optical filter that selectively transmits left-handed circularly polarized light, the character pattern of "OK" appears to be white on black background at high contrast.

9. Ninth Embodiment

In this embodiment, the light absorption layer and concurrently adhesive layer 101 in the first embodiment shown in FIG. 1 is mixed with magnetic particles. Thus, a function of a magnetic layer that generates a magnetic field is added to the light absorption layer and concurrently adhesive layer 101. In the light absorption layer and concurrently adhesive layer 101 into which a magnetic material is mixed, a strong magnetic field is applied in the direction perpendicular to the surface thereof so as to magnetize and to generate a magnetic field in the direction perpendicular to the surface thereof. According to this structure, the magnetic particles 102b are continuously oriented in the perpendicular direction until a magnetic field is specifically applied from the outside. Therefore, the identification medium 100 exhibits the optical characteristics of the cholesteric liquid crystal layer 105 until a magnetic field is specifically applied from the outside.

The observing surface side is traced with a magnetic pen, and the magnetic pen generates a parallel magnetic field that is stronger than that generated by the light absorption layer and concurrently adhesive layer 101. As a result, the primary surfaces of the flake-like magnetic particles 102b under the traced portion are oriented along the direction parallel to the layer. Therefore, a white trace is formed. In this case, when the identification medium is directly observed, the white trace can be observed at low contrast. When the identification medium is observed through an optical filter that selectively transmits left-handed circularly polarized light, the white trace can be observed on a black background at high contrast. Then, when the magnetic pen is removed, the effect of the magnetism of the light absorption layer and concurrently adhesive layer 101 appears, and the white trace disappears. In this case, the light absorption layer and concurrently adhesive layer 101 may generate a parallel magnetic field, and a perpendicular magnetic field may be applied by the magnetic pen.

10. Tenth Embodiment

In this embodiment, the portion, at which the magnetic microcapsules exist in the ninth embodiment, is formed into a predetermined pattern. For example, the magnetic microcapsules are dispersed into an area of the character pattern of "OK". In this case, when no external magnetic field is applied, the flake-like magnetic particles are oriented in the perpendicular direction, whereby the incident light is transmitted through the magnetically controllable sheet. Therefore, the display of "OK" cannot be recognized, and the optical function of the cholesteric liquid crystal layer appears. Then, when a strong parallel magnetic field is applied to the entire surface, the effect of the magnetic field is strong, and the primary surfaces of the magnetic particles in the magnetic microcapsules are horizontally oriented. Therefore, light is reflected at the area of the magnetic microcapsules forming the pattern of "OK". In this case, when the identification medium is directly observed, a white display of "OK" can be seen at low contrast. On the other hand, when the identification medium is observed through an optical filter that selectively transmits left-handed circularly polarized light, the white display of "OK" can be seen in the black background at high contrast. Then, when the magnetic field is removed, the effect of the magnetic field generated by the light absorption layer and concurrently adhesive layer 101 is increased. Therefore, the flake-like magnetic particles are oriented in the perpendicular direction, and the white display of "OK" thereby disappears.

11. Eleventh Embodiment

In this embodiment, the light absorption layer and concurrently adhesive layer 101 in the first embodiment is replaced with a light transparent adhesive layer. In addition, the color of the primary surfaces of the flake-like magnetic particles 102b is set to be black. In this structure, the magnetically controllable sheet under a portion to which a parallel magnetic field is applied is replaced with a light absorption layer.

For example, when the identification medium is traced with a magnetic pen for applying a parallel magnetic field after a perpendicular magnetic field is applied to the entire surface, the pattern of the trace appears to be black. Then, when the identification medium is observed through an optical filter that transmits left-handed circularly polarized light, the pattern appears to be black on the color of the background of the adhesive surface at high contrast.

When the identification medium is traced with a magnetic pen for applying a perpendicular magnetic field after a parallel magnetic field is applied to the entire surface, the pattern of the trace appears to be the color of the background. Then, when the identification medium is observed through an optical filter that transmits left-handed circularly polarized light, the pattern is observed to appear to be the color of the background in the black color exhibited by the magnetic particles. The structure in which the light absorption layer and concurrently adhesive layer 101 is replaced with a light transparent adhesive layer may be used in other embodiments.

12. Twelfth Embodiment

In the first to the eleventh embodiments, instead of the cholesteric liquid crystal layer 105, a color shifting film formed by laminating light transparent films having different refractive indexes may be used. In this structure, when the microcapsules under a portion turn a color other than black, light reflected from the microcapsules and interfering light from the color shifting film are observed at the portion. Therefore, the portion, under which the color of the microcapsules is changed, appears to be a bright color relative to the other portion. In this portion, since there is light reflected from the microcapsules, the effect of color shifting of the color shifting film, which appears as the viewing angle is increased, is relatively small. Therefore, the portion under which the color of the microcapsules is changed can be observed distinctly. That is, when the identification medium is tilted, characters and figures formed at the portion, under which the color of the microcapsules is changed, can be observed at high contrast during color shifting.

Two kinds of resin films having different refractive indexes may be prepared and be alternately laminated at least several dozen of layers, and the films may be used as a color shifting film. A unit may be formed by laminating three kinds of resin films having different refractive indexes in turn, and a structure formed by laminating plural units may be used as a laminated structure. Alternatively, a structure may be formed by alternately laminating two kinds of resin films having different refractive indexes. For example, PET (polyethylene terephthalate) films and PEN (polyethylene naphthalate) films are alternately laminated so as to form a color shifting film.

13. Thirteenth Embodiment

The color shifting film of the twelfth embodiment may be formed with a hologram. In this case, the figure of the hologram is observed with color shifting.

14. Fourteenth Embodiment

Figure 6:
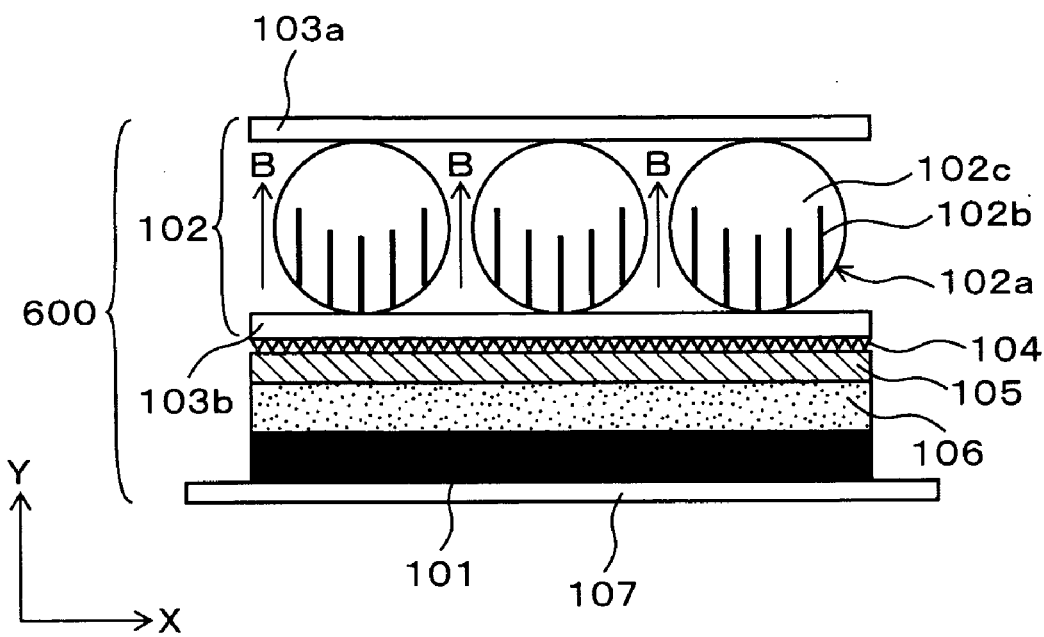
FIG. 6 is a schematic view showing a cross sectional structure of an identification medium using the invention.
Figure 7:
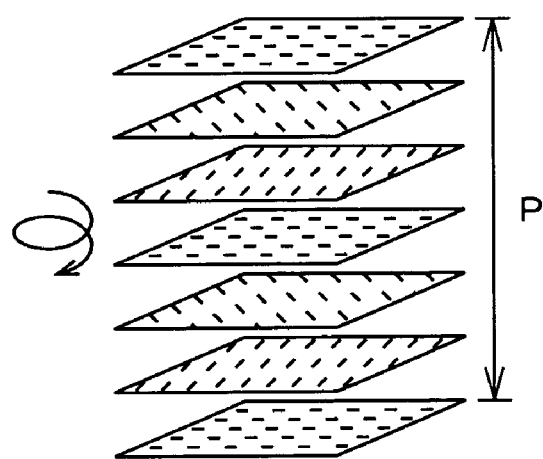
FIG. 7 is a schematic view showing a structure of a cholesteric liquid crystal.
Figure 8:
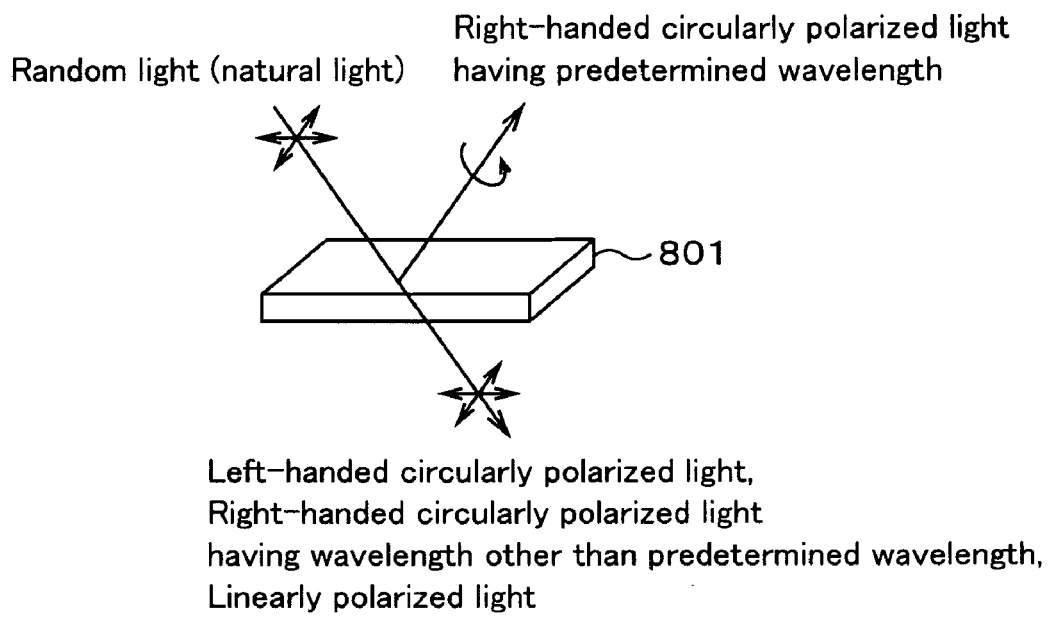
FIG. 8 is a schematic view for describing an optical characteristic of a cholesteric liquid crystal.
Figure 9:
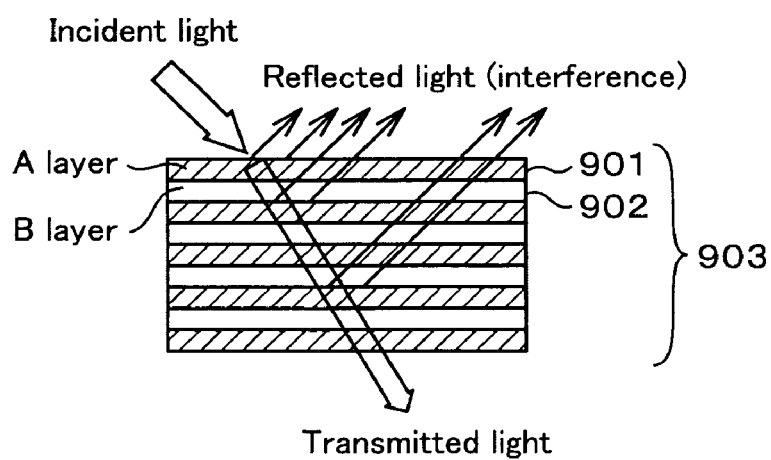
FIG. 9 is a schematic view for describing an optical characteristic of a multilayer film.

In this embodiment, the magnetically controllable sheet is used as a device, and the function of the magnetically controllable sheet can be selected from one of a light cut-off layer and a light transmission layer by applying a magnetic field. In this embodiment, a magnetically controllable sheet 102 that is a structural component of the identification medium 100 shown in FIG. 1 is prepared. A cholesteric liquid crystal layer 105 is disposed under the magnetically controllable sheet 102, and an observation is performed from the side of the magnetically controllable sheet 102. FIG. 6 is a schematic view showing an outline of an identification medium of the embodiment. In an identification medium 600 shown in FIG. 6, a cholesteric liquid crystal layer 105 is provided on a light transparent resin film, and a light absorption layer and concurrently adhesive layer 101 is disposed at the back surface of the light transparent resin film. Moreover, the light absorption layer and concurrently adhesive layer 101 is attached with a separator 107. The cholesteric liquid crystal layer 105 is formed with an embossed pattern 104 for forming a hologram. The reference numeral 102 indicates a magnetically controllable sheet in which magnetic microcapsules 102a are maintained between a pair of light transparent resin films 103a and 103b. The magnetic microcapsules 102a contain flake-like magnetic particles 102b and dispersing liquid 102c. FIG. 6 shows a condition in which a perpendicular magnetic field (magnetic field in the Y direction) is applied, and the flake-like magnetic particles 102b are oriented so that the primary surfaces thereof are parallel to the perpendicular direction (Y direction).

The identification medium 600 may be observed from the light transparent resin film 103a. When the identification medium 600 in the condition shown in FIG. 6 is directly observed, since the incident light is transmitted through the magnetically controllable sheet 102, the optical function of the cholesteric liquid crystal layer 105 can be observed. When a parallel magnetic field is applied, the primary surfaces of the magnetic particles 102b are oriented along the horizontal direction (X direction). In this case, the reflection of the magnetic particles 102b is extremely increased, and the light reflected from the cholesteric liquid crystal layer 105 is thereby difficult to observe. That is, the emergence of the optical function of the cholesteric liquid crystal layer 105 can be controlled by way of applying a magnetic field.

In this embodiment, the cholesteric liquid crystal layer 105 may be replaced with a color shifting film. Moreover, other forms may be used as the magnetic microcapsules. The area of the magnetic microcapsules may be formed into a predetermined pattern, or the cholesteric liquid crystal layer 105 may be formed into a predetermined pattern.

INDUSTRIAL APPLICABILITY

The present invention may be used for discrimination mediums for determining authenticity. The identification medium of the present invention may be incorporated in an article to be identified. In that case, an article provided with a function of a discrimination medium can be obtained.

The invention claimed is:

1. An identification medium provided with a laminated structure comprising laminated layers of:
    a magnetically controllable layer in which magnetic microcapsules are dispersed;
    a color shifting layer; and
    a magnetic layer for applying a magnetic field,
    the color shifting layer comprising a cholesteric liquid crystal layer or a film formed by laminating plural light transparent films having different refractive indexes, and
    the magnetic microcapsules containing black magnetic particles and powders of pigments which are dispersed in the magnetic microcapsules.

2. The identification medium according to claim 1, wherein the color shifting layer is formed with a hologram.

* * * * *